Nov. 20, 1962  A. KIRCHER, JR  3,064,701
APPARATUS FOR FORMING SAUSAGE EMULSIONS AND THE LIKE
Filed Oct. 20, 1958  2 Sheets-Sheet 1

INVENTOR:
Albert K. Kircher Jr.,
BY Bair, Freeman & Molinare
ATTORNEYS.

Nov. 20, 1962 A. KIRCHER, JR 3,064,701
APPARATUS FOR FORMING SAUSAGE EMULSIONS AND THE LIKE
Filed Oct. 20, 1958 2 Sheets-Sheet 2
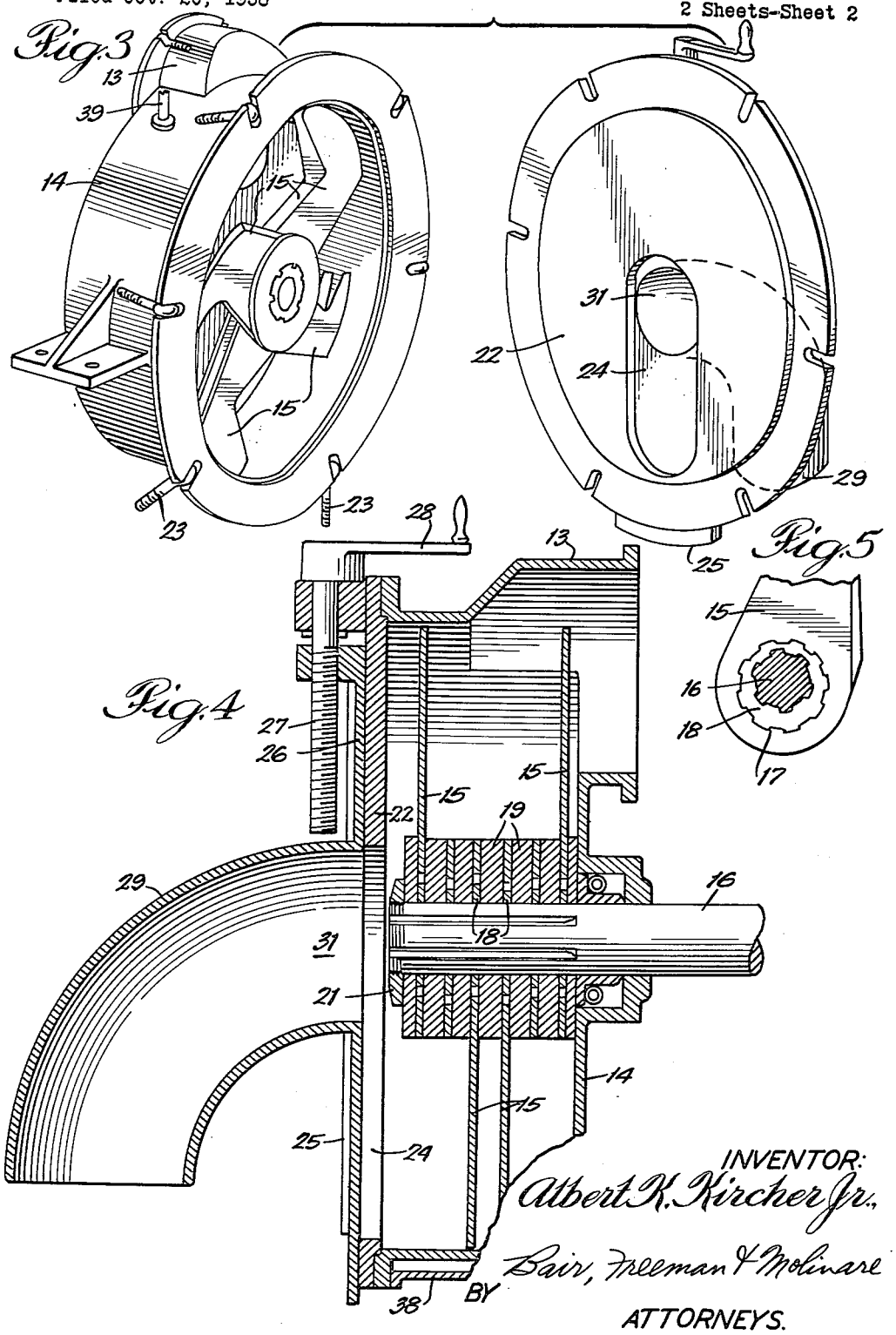
INVENTOR:
Albert K. Kircher Jr.,
Bair, Freeman & Molinare
BY
ATTORNEYS.

United States Patent Office 3,064,701
Patented Nov. 20, 1962

3,064,701
APPARATUS FOR FORMING SAUSAGE EMULSIONS AND THE LIKE
Albert Kircher, Jr., Downers Grove, Ill., assignor to The Fitzpatrick Company, a corporation of Illinois
Filed Oct. 20, 1958, Ser. No. 768,188
1 Claim. (Cl. 146—182)

This invention relates to apparatus for forming sausage emulsions and the like and more particularly to apparatus for continuously reducing chunks of meat products to uniform size particles in the manufacture of sausage and sausage emulsions.

Sausage and sausage emulsions have heretofore been formed by cutting chunks or hunks of meat and other materials to be mixed therewith in a so-called "silent" cutter. This is strictly a batch operation in which the materials are placed in a bowl and cutting knives are passed therethrough progressively until the material is reduced to the desired particle size. Also, this operation results in distortion of a large percentage of the fat in the product through smearing by which the fat is wiped or smeared on the knife and walls of the bowl. In the final product the fat retained therein is not intimately mixed with the remaining portions of the material and tends to separate therefrom, especially when the product is canned, to result in undesired fat capping or fatting out.

A process for the continuous formation of sausage emulsions has heretofore been proposed in the copending application of Kircher and Manion, Serial No. 599,374, filed July 23, 1956, now Patent No. 2,874,054. The present invention utilizes some of the principles of that process and provides an improved and simplified apparatus. The apparatus of the present invention may also be used for the preparation of cured meat products as disclosed and claimed in the application of Covey, Serial No. 642,091, filed February 25, 1957, now Patent No. 2,907,662.

It is one of the objects of the present invention to provide a relatively simple apparatus for continuously forming sausage or sausage emulsions.

Another object is to provide apparatus in which the particle size or fineness can easily be adjusted even while the apparatus is in operation.

A further object is to provide apparatus in which the meat is processed rapidly and without fat smearing to produce a highly desirable uniform product.

Still another object is to provide an apparatus in which the cutting blades are positively and accurately held and yet may be easily adjusted to compensate for blade change of size after sharpening.

A still further object is to provide an apparatus which is easily opened for cleaning and in which all parts may be fully cleaned.

The above and other objects and features of the invention will be more readily apparent from the following description when read in connection with the accompanying drawings, in which:

FIGURE 3 is a perspective view of the cutting mechanism with the cover removed;

FIGURE 4 is a central sectional view through the cutting mechanism and

FIGURE 5 is a partial section through the cutting shaft showing mounting of a cutting blade thereon.

Figure 1:
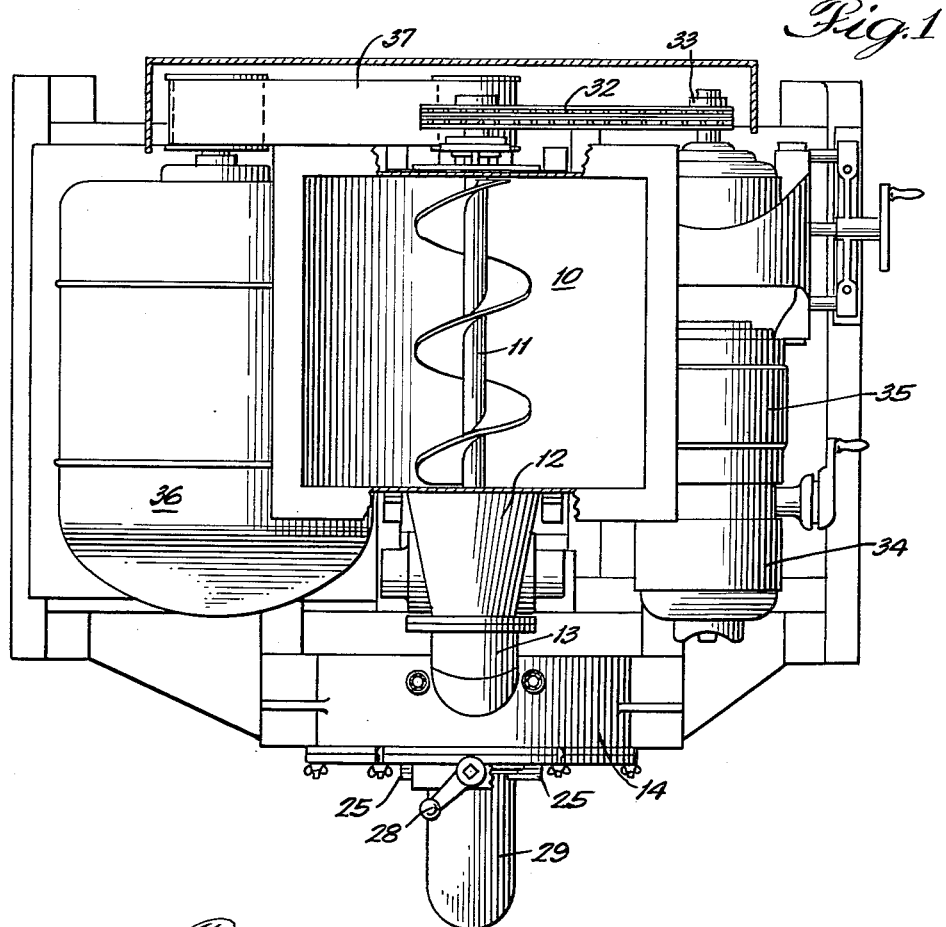
FIGURE 1 is a top plan view of apparatus embodying invention with parts broken away and in section.
Figure 2:
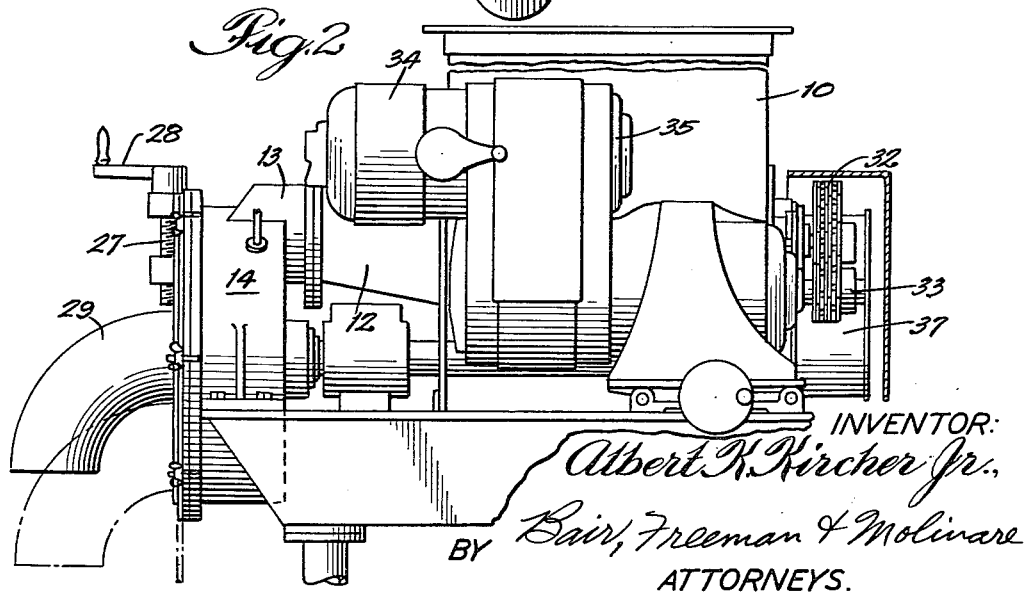
FIGURE 2 is a side elevation of the apparatus.

In the apparatus as shown the meat or meat products to be processed are placed in a hopper, indicated generally at 10 and which may be of any desired size to hold a desired quantity of material. The hopper is preferably tapered on its sides to a relatively narrow bottom and a feed screw 11 is mounted in the bottom of the hopper to force the meat material therefrom through a conduit or nozzle 12. The conduit or nozzle 12 is preferably detachably secured to the hopper for easy removal therefrom for cleaning.

At its opposite end the conduit or nozzle 12 is detachably connected to a feed conduit 13 on a cutter housing 14. As best seen in FIGURES 3 and 4, the cutter housing 14 is cylindrical and is mounted with its axis horizontal. The feed conduit 13 opens into the top of the cutter housing, preferably extending slightly above the housing at one end thereof to supply the meat material to the housing at its top central portion. The housing is of short axial length relative to its diameter, preferably being of an axial length something less than one-half its diameter as shown.

Material fed into the housing is adapted to be cut by a series of cutting blades 15 which are spaced axially and angularly relative to each other on a driving shaft 16 which extends axially into the housing. The blades are preferably shaped as best seen in FIGURE 3 with backwardly turned tip portions and are sharpened at their leading edges and along the backwardly extending tip portions.

For mounting the blades adjustably on the shaft the construction as best seen in FIGURES 4 and 5 is employed. As shown, the shaft is splined throughout its portion thereof lying within the housing and the blades are formed with openings at their hub portions which are splined or serrated and are of larger diameter than the shaft as indicated at 17 in FIGURE 5. The blades are mounted on and connected to the shaft through serrated or splined discs 18 having internal splined openings therein to fit onto the shaft and an external splined surface to cooperate with the internal splined openings in the blades. The openings in the mounting discs 18 are eccentric with respect to each other so that by turning the mounting discs to different positions relative to the blades, the radial length of the blades from the shaft axis can be adjusted and when the parts are assembled the blades will be securely held against any movement relative to the shaft.

In assembling the blades on the shaft the blades are mounted on the spacing discs 18, as shown in FIGURE 3, and are slipped over the shaft with spacer discs 19 between the adjacent blades and mounting discs. The spacer discs are of greater radius than the maximum radius of the mounting discs so that they will grip both the mounting discs and the blades and will hold them in properly assembled relationship on the shaft. A fastening such as a screw 21 may be secured on the end of the shaft to hold the blades accurately positioned thereon and to permit removal thereof for sharpening or replacement.

The outer end of the housing 14 is closed by a cover plate 22 which is detachably connected to the housing for easy removal therefrom. As shown, conventional swing bolts 23 are provided on the housing to feed into slots in the periphery of the cover plate although any other desired type of fastenings could be employed. The cover plate 22 is formed in its lower central portion with an elongated vertical slot 24 through which processed material may be discharged.

In order to adjust the fineness of the processed material the effective level of the discharge opening from the cutter housing may be adjusted. For this purpose the cover plate carries vertical guide strips 25 spaced on opposite sides of the slot 24 on its exterior and a discharge plate 26 fits slidably between the strips for vertical movement over the cover plate. The plate 26 may be adjusted vertically, as for example by means of a screw 27 threaded through a lug on the plate and adapted to be turned by a handle 28. The cover plate carries a discharge conduit 29 opening through the cover plate in a circular discharge port 31 which registers with the slot 24. By adjusting the plate 26 vertically the level of the discharge port 31 is adjusted and the fineness of the processed material is controlled. It will be seen that this operation could be performed if desired even while the apparatus is running.

The apparatus is completed by driving means for the feed screw 11 and the rotor shaft 16. As shown, the feed screw 11 is driven through a sprocket chain 32 passing over a sprocket on one end of the feed screw shaft and over a driving sprocket 33. The driving sprocket is driven by a motor 34 through an adjustable speed reducer mechanism 35 so that the rate of feed can be controlled. The shaft 16 is driven by a relatively larger motor 36 through a belt 37 and pulleys on the shaft and motor shaft. In normal operation of the apparatus the shaft 16 is driven at a speed on the order of 2200 r.p.m.

In operation of the apparatus chunks or hunks of meat and other material to be processed and mixed therewith are fed into the hopper and the motors are started. The feed screw 11 will feed this meat material through the conduit 12 and into the feed conduit 13 into the upper part of the cutter housing against the centrifugal pressure produced by the rotor blades. With the blades 15 rotating at high speed as described above, the material entering the upper part of the chamber will be struck by the blades and cut thereby while suspended in the chamber, it being noted that there is always an appreciable amount of void space in the casing varying with adjustment of the plate 26. Due to the angular and axial spacing of the blades, all of the material entering the chamber will be cut very rapidly and the cut material will be discharged from the chamber in a minimum time. For this reason the material is not wiped over the blades or wiped against the cutting chamber wall to any appreciable extent and fat smearing is minimized or eliminated. It has also been found that due to the high speed of the cutting action, the fat remaining in the material is uniformly mixed therein and the material is cut to a very uniform particle size so that the resulting product will not be subject to fat separation or to non-uniformity in other respects.

When it is desired to reduce the material to a relatively small particle size, as for example in various types of sausage emulsions, the plate 26 may be raised to its upper position as shown. This tends to cause the machine to operate with the casing more nearly full so that any given particle will have a slightly longer retention time in the casing and will be reduced to a finer particle size. For coarser products the plate 26 may be lowered so that the processed material can be discharged from the cutting housing more rapidly and with a higher particle size. In any case, due to the rapidity of the operation a very uniform product is obtained.

For various types of processing it is desirable to cool the product, at least to remove therefrom the heat generated during the cutting operation. For this purpose the cutting housing may be provided with a double peripheral wall, as shown at 38, through which cooling liquid may be circulated by means of conduits partially shown at 39. In addition, volatile cooling materials such as $CO_2$ or $N_2$ may be injected into the cutter casing or into the inlet conduit 13 during operation to cool the meat material and to maintain it in a non-oxidizing atmosphere.

While one embodiment of the invention has been shown and described in detail, it will be understood that this is illustrative only and is not to be taken as a definition of the scope of the invention, reference being had for this purpose to the appended claim.

What is claimed is:

Apparatus for forming sausage emulsions and the like comprising a cylindrical housinig mounted with its axis horizontal and short axially relative to its diameter and defining a smooth unobstructed interior space, a rotor in said space coaxial with the housing and having a series of axially and angularly spaced blades thereon terminating adjacent to the housing inner wall, means to drive the rotor, an inlet conduit opening into the housing at one end thereof and at the top of the housing, means to supply meat material to the housing through the inlet conduit under pressure, the other end of the housing having a vertically elongated slot therein, a plate slidably mounted on the other end of the housing and having a discharge opening therein communicating with the slot in different vertical positions as the plate is slid vertically, and means for moving the plate vertically.

References Cited in the file of this patent

UNITED STATES PATENTS

| | | |
|---|---|---|
| 281,511 | Howland | July 17, 1883 |
| 449,585 | Jull | Mar. 31, 1891 |
| 1,686,953 | Brown | Oct. 9, 1928 |
| 2,140,076 | Fromm | Dec. 13, 1938 |
| 2,617,460 | Levit | Nov. 11, 1952 |
| 2,687,734 | Jones | Aug. 31, 1954 |
| 2,804,112 | Schaller | Aug. 27, 1957 |
| 2,854,045 | Schmidt | Sept. 30, 1958 |
| 2,874,054 | Kircher et al. | Feb. 17, 1959 |